US008368721B2

(12) United States Patent
McCoy (10) Patent No.: US 8,368,721 B2
(45) Date of Patent: Feb. 5, 2013

(54) APPARATUS AND METHOD FOR ON-FIELD VIRTUAL REALITY SIMULATION OF US FOOTBALL AND OTHER SPORTS

(76) Inventor: Anthony McCoy, Houston, TX (US)

( * ) Notice: Subject to any disclaimer, the term of this patent is extended or adjusted under 35 U.S.C. 154(b) by 1106 days.

(21) Appl. No.: 11/973,180

(22) Filed: Oct. 6, 2007

(65) Prior Publication Data

US 2009/0091583 A1  Apr. 9, 2009

(51) Int. Cl.
*G09G 5/00* (2006.01)
(52) U.S. Cl. ............ 345/633; 434/36; 434/37; 434/251; 463/4
(58) Field of Classification Search .................. 345/633; 463/4; 434/36, 37, 251; 473/438
See application file for complete search history.

(56) References Cited

U.S. PATENT DOCUMENTS

| | | | | |
|---|---|---|---|---|
| 4,303,394 A | * | 12/1981 | Berke et al. ...................... | 434/40 |
| 4,398,799 A | * | 8/1983 | Swift ............................ | 359/632 |
| 4,553,534 A | | 11/1985 | Stiegler | |
| 4,751,642 A | * | 6/1988 | Silva et al. ...................... | 473/152 |
| 4,807,202 A | * | 2/1989 | Cherri et al. ................... | 367/129 |
| 4,884,219 A | * | 11/1989 | Waldren ............................ | 345/8 |
| 4,897,715 A | * | 1/1990 | Beamon, III .................. | 348/115 |
| 4,918,603 A | * | 4/1990 | Hughes et al. .................... | 463/4 |
| 5,320,534 A | | 6/1994 | Thomas | |
| 5,423,554 A | * | 6/1995 | Davis ................................ | 463/4 |
| 5,673,082 A | * | 9/1997 | Wells et al. .................... | 348/139 |
| 5,684,531 A | * | 11/1997 | Li et al. .......................... | 348/139 |
| 5,759,044 A | * | 6/1998 | Redmond ................. | 434/307 R |
| 5,882,204 A | * | 3/1999 | Iannazo et al. ................. | 434/251 |
| D426,545 S | | 6/2000 | Smith et al. | |
| 6,308,565 B1 | * | 10/2001 | French et al. ............... | 73/379.04 |
| 6,549,641 B2 | * | 4/2003 | Ishikawa et al. .............. | 382/103 |
| 6,588,022 B1 | | 7/2003 | Anders et al. | |
| 6,710,713 B1 | * | 3/2004 | Russo .......................... | 340/573.1 |
| 7,155,158 B1 | * | 12/2006 | Iuppa et al. .................... | 434/350 |
| 7,292,151 B2 | * | 11/2007 | Ferguson et al. .......... | 340/573.1 |
| 7,460,250 B2 | * | 12/2008 | Keightley et al. ............. | 356/625 |
| 7,843,429 B2 | * | 11/2010 | Pryor ............................ | 345/158 |
| 2002/0036617 A1 | * | 3/2002 | Pryor ............................ | 345/156 |
| 2002/0163486 A1 | * | 11/2002 | Ronzani et al. .................. | 345/87 |
| 2003/0227453 A1 | * | 12/2003 | Beier et al. ..................... | 345/419 |
| 2004/0104935 A1 | * | 6/2004 | Williamson et al. .......... | 345/757 |
| 2005/0280603 A1 | * | 12/2005 | Aughey et al. .................... | 345/8 |
| 2006/0017654 A1 | * | 1/2006 | Romo ................................ | 345/7 |
| 2006/0116185 A1 | * | 6/2006 | Krull ................................ | 463/4 |
| 2006/0246972 A1 | * | 11/2006 | Thomas et al. .................. | 463/4 |
| 2006/0252541 A1 | * | 11/2006 | Zalewski et al. ................ | 463/36 |

(Continued)

FOREIGN PATENT DOCUMENTS

WO  0107130 A1  2/2001

*Primary Examiner* — M Good Johnson
(74) *Attorney, Agent, or Firm* — Russ Weinzimmer; Russ Weinzimmer & Associates PC (57) ABSTRACT

An apparatus and method are disclosed for simulating United States football and other sports that are held on a playing field. The user stands in an area that at least approximates an actual playing field, and an apparatus incorporated into a football helmet or other headgear worn by the user superimposes simulation images onto the field of view of the user, creating an illusion of simulated action taking place on the actual field where the user is standing. This makes the information and skills conveyed by the simulation directly relevant and immediately useful. Preferred embodiments track the location and orientation of the user and thereby allow the user to participate in the simulation. In another aspect, essentially the same apparatus and method are used to simulate driving or flying of vehicles without the need of an expensive mockup of the interior of the vehicle.

17 Claims, 7 Drawing Sheets

U.S. PATENT DOCUMENTS

2006/0281061 A1* 12/2006 Hightower et al. .......... 434/247
2007/0026974 A1* 2/2007 Marty et al. ................. 473/467
2007/0026975 A1* 2/2007 Marty et al. ................. 473/467
2009/0033655 A1* 2/2009 Boca et al. ................... 345/419

* cited by examiner

APPARATUS AND METHOD FOR ON-FIELD VIRTUAL REALITY SIMULATION OF US FOOTBALL AND OTHER SPORTS

FIELD OF THE INVENTION

The invention relates generally to virtual reality simulation, and more specifically to virtual reality simulation of US football and other sports that are held on a playing field, as well as simulation of driving and flying vehicles.

BACKGROUND OF THE INVENTION

Despite considerable success in other fields, virtual reality simulation has had only limited success in the training of players of sports such as US football that take place on a playing field. This is largely due to the difficulty of creating a convincing and believable simulation of such a large and open environment.

For many applications that pertain to smaller and more confined environments, virtual reality simulation is well known as a powerful tool for strategy development and skill training. Military uses include the training of tank drivers and aircraft pilots. Some of these training simulations include complete battle simulations, with both real and simulated participants. Civilian applications include the training of private and commercial aircraft pilots, truck drivers, and automobile drivers.

Skills acquired from virtual reality simulations are most easily applied to real life when the simulations are highly convincing and realistic. Simulations of enclosed environments such as aircraft cockpits and automobile interiors have proven to be very successful in this regard, in part because the simulation apparatus can include a detailed physical replica, or "mock-up," of the enclosed environment being simulated, and also because the simulation video may be projected onto the windows and windshields that naturally surround these environments.

In some of these applications, a helmet-mounted apparatus is used to augment the simulation by projecting additional simulated video directly onto the viewer's field of vision, using partially transmitting mirrors, liquid crystal displays, or other means placed directly in front of the viewer's eyes. This is generally done to provide brighter and higher definition video with a three-dimensional perspective. Means are included in these cases for sensing the movements of the viewer's head and adjusting the simulation accordingly.

In addition to strategy development and skill training, virtual reality simulation of enclosed environments such as aircraft, spacecraft, racing cars, and tanks has also proven to be a highly successful form of entertainment. However, because of the expense of providing a detailed and convincing simulation environment, these forms of entertainment have been confined to amusement parks and other venues where they are economically practical.

In the case of playing field sports such as US football, the environment is too large and too open to allow the use of a physically simulated mock-up environment. Instead, the viewer is typically placed inside a relatively small, enclosed space, sometimes called a "cave," and views of the playing field are projected onto the blank walls and floor of the enclosure. Stereo-optical projection is sometimes employed, whereby the viewer wears special glasses in order to experience a pseudo three-dimensional effect. Although this approach provides for a simulation with a certain degree of realism, it is typically not able to achieve a convincing and believable effect comparable to simulations of more enclosed environments. In particular, this approach does not allow the viewer to move very far in any direction. This has hampered the ability of playing field sport simulations to convey skills that can be readily transferred to an actual playing field.

SUMMARY OF THE INVENTION

The apparatus and method of the invention apply virtual reality technology to the simulation of US football and other sports that take place on a playing field. The invention employs headgear-based display technology, and can be used for training and/or other purposes. The user of the invention views the simulation while standing or otherwise located on an actual playing field appropriate to the sport of interest, and the headgear display superimposes simulation video images onto the user's field of view, thereby causing the simulation to appear as if it is taking place on the actual playing field, substantially as it would in reality. The result is a simulation experience that is convincing and highly realistic, allowing greater enjoyment when used for recreational purposes, and allowing the acquired skills and strategies to be readily applied to actual sport activities promptly after the simulation when used for training purposes.

In preferred embodiments, LASER triangulation and/or other position and orientation sensing technology is used to determine the user's location and the orientation of his head at all times. This information is used to continuously adjust the simulation, keeping it aligned with the user's environment and allowing the user to move about freely during the simulation, either to view the simulation from different perspectives or to actively participate in it. In a further preferred embodiment, artificial intelligence technology is included in the invention, allowing the user to specify the actions of only one or of any subset of the players, with the actions of the remaining players being determined by the simulation according to specified rules of behavior. Artificial intelligence may also be used to allow simulated players to react to the movements of the user in a realistic manner, thereby creating the illusion that the user is actively participating in the simulation.

The invention can also be used to provide convincing and enjoyable simulation of activities that take place in enclosed environments, such as piloting a spacecraft, aircraft, racecar, or tank, without the expense of providing a detailed replica of the simulated environment. In these cases, the headgear of the invention provides a full visual experience while the user is seated in a normal passenger vehicle or possibly in nothing more than a darkened room. In preferred embodiments, an approximate replica of a steering wheel or other appropriate control mechanism is provided to allow the user to control and interact with the simulation. Actions and reactions of other vehicles can be simulated by use of artificial intelligence in a manner essentially identical to the description given above for the simulation of other players on a playing field.

BRIEF DESCRIPTION OF THE DRAWINGS

The invention will be more fully understood by reference to the detailed description, in conjunction with the following figures, wherein.

DETAILED DESCRIPTION OF THE PREFERRED EMBODIMENTS

Figure 1:
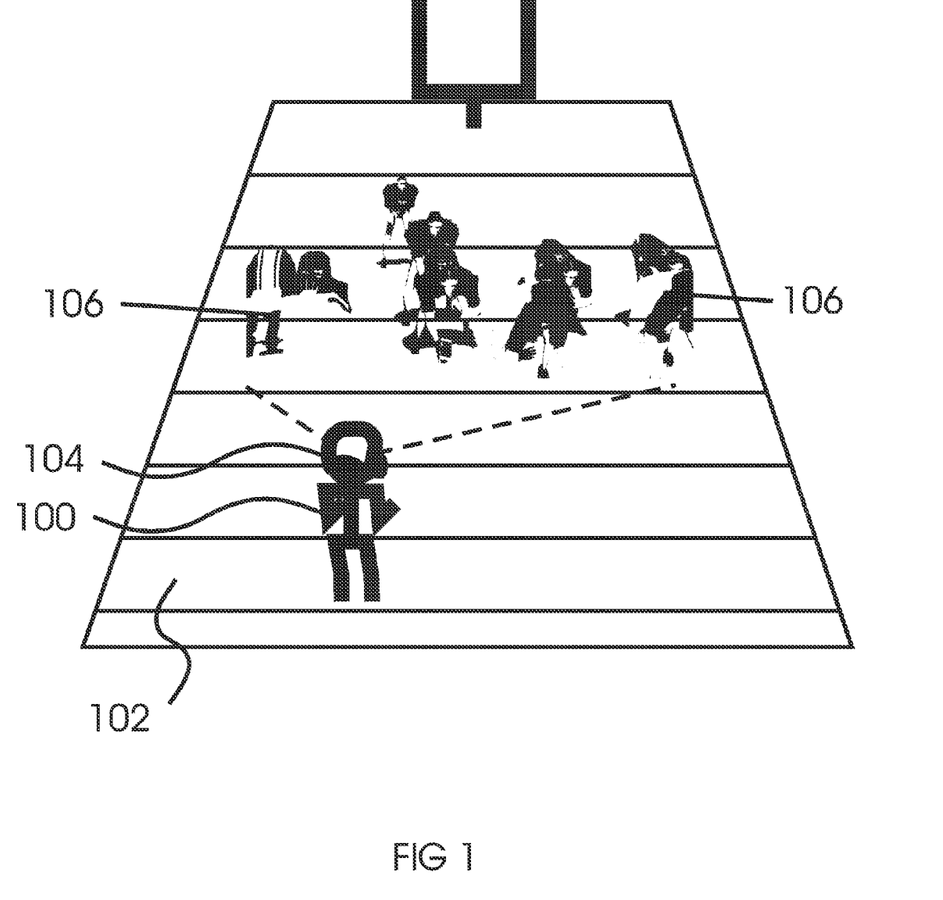
FIG. 1 is a sketch of a user of the invention viewing simulated US football action superimposed onto an actual US football field.

Referring to FIG. 1, the invention can be used to create a simulation of a sport, such as US football, that is performed on a playing field. The user 100 stands on an actual playing field 102, wearing a helmet 104 or other headgear that superimposes images of simulated players 106 onto the user's field of vision, making them appear to carry out their actions on the actual field on which the user is located.

The simulation can be used to train players of the sport, such as football players, on a real football field. Each football player can see a play unfold right on the actual field where the play is to take place. Further, the players can then rapidly and easily take the field immediately after experiencing the simulation of the play, without removing the helmet of the invention that provided the simulation of the play. Thus, very little time goes by between the time the training simulation is experienced and the time that the play begins on the actual field of play. Consequently, the play information is still vividly fresh in the minds of the players, and their performance is thereby improved and their rate of learning is accelerated. The rapid enactment of the play enables more complex plays to be communicated and taught to a group of players. Also, since the accuracy of the memory of a training experience decreases with time, reducing the time from the training to the actual performance of a play results in more accurate recall, and consequently less errors being made. Therefore, fewer repetitions of the play by the players are required during practice.

Further, the invention can be used to rapidly and effectively communicate customized play information to each player of a team before each play in an actual game.

Figure 2:
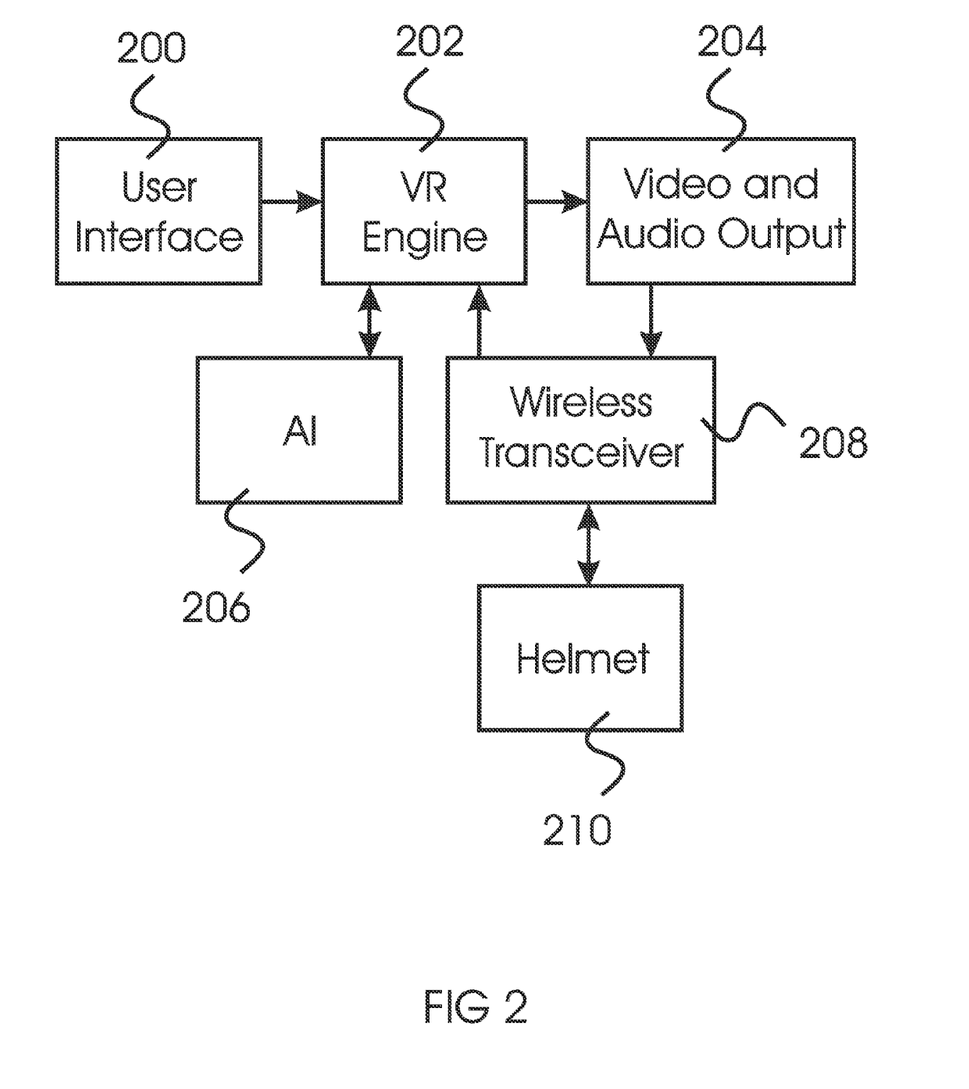
FIG. 2 is a block diagram of the invention.
Figure 3:
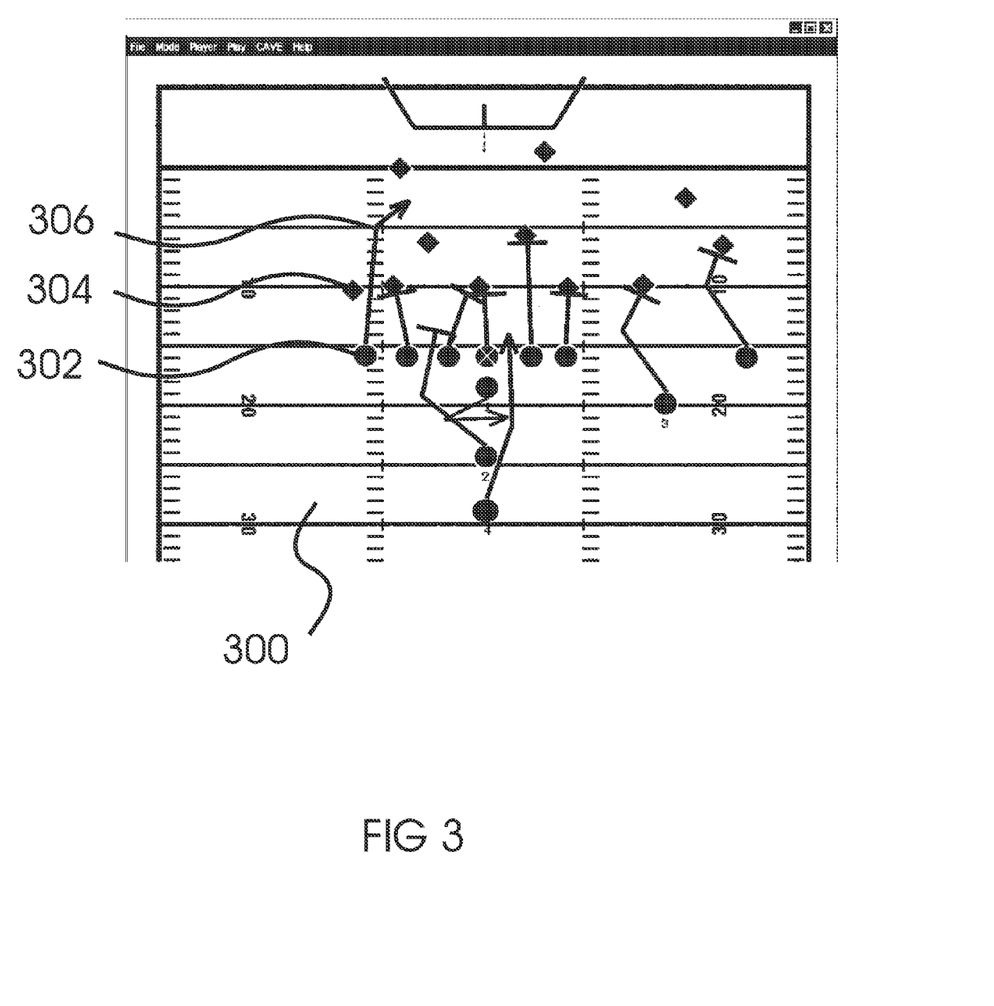
FIG. 3 is a typical diagrammatic computer display used for the specification of US football plays.

FIG. 2 presents a block diagram of the a preferred embodiment of the invention intended for simulation of sports activities. A software and hardware user interface 200 is provided that enables diagrammatic specification of US football plays or other simulated sport action, such as shown in FIG. 3. This input is then processed by the virtual reality simulation software "engine," 202 which generates output video and audio 204 for display to a wearer of the helmet 210 of the invention. In a preferred embodiment, artificial intelligence software 206 is used to determine the actions of players that were not specifically defined in the input. For example, the user input can include specifying the starting positions of all the players, and the intended actions of the offensive team, with no specification regarding the actions of the defensive team. The simulation computer then uses artificial intelligence to apply specified rules of player behavior, and thereby assign movements and actions to the defensive players.

A wireless transmitter 208 is used to transmit the simulation video and audio to the viewing helmet 210, and also to transmit information regarding the location and orientation of the viewer from the helmet to the simulation computer 202, so as to allow the simulation computer 202 to adjust the orientation and scale of the simulation to match the location of the viewer on the field. Artificial intelligence software 206 may also be used to cause the simulated players to respond to the actions of the viewer during the simulation according to specified rules of behavior.

FIG. 3 presents a typical user interface for specifying US football plays. A sketch of a football field 300 is presented on the screen, and simple icons representing offensive 302 and defensive 304 players are positioned using a mouse, light pen, or other pointing device. Lines 306 are then drawn on the screen to indicate the patterns to be run by each of the players. The interface is intentionally designed to approximate the diagrams that are traditionally drawn by hand to represent US football plays.

Figure 4:
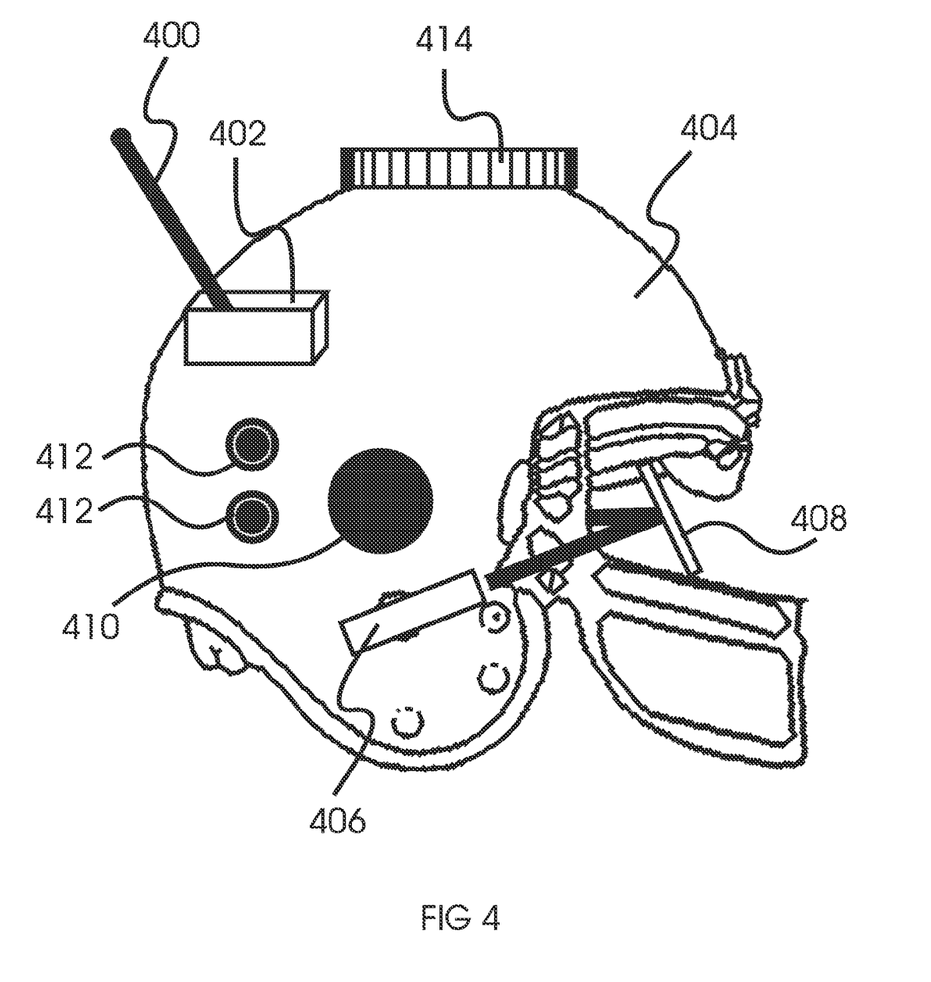
FIG. 4 is a sketch of a preferred embodiment of the simulation display helmet.

A preferred embodiment of the simulation display helmet 210 is illustrated in FIG. 4. The helmet of this embodiment resembles a standard US football helmet, in both appearance and feel to the user while wearing it. In other preferred embodiments, the helmet or other headgear would be cosmetically and physically designed to resemble the look and feel of headgear used in other sports as appropriate, such as race car driving. An antenna 400 and radio transceiver 402 are attached to the helmet 404, for the purpose of receiving simulation data from the simulation computer 202 and for transmitting location and orientation data back to the simulation computer 202 for calibration.

A pair of video projectors 406 are attached to the sides of the helmet, and directed such that they can project images onto partially reflecting mirrors 408 positioned in front of the eyes of the wearer. The reflectivity of the partially reflecting mirrors is chosen such that the projected video reflected from the mirrors into the wearer's eyes will have a brightness approximately equal to the ambient light that passes through the mirrors into the wearer's eyes. As an alternative (not shown), the same result may be achieved by placing partially transparent liquid crystal video displays or similar devices directly in front of the user's field of vision.

Speakers or headphones 410 are attached to the helmet 404 to provide the audio part of the simulation.

A plurality of knobs 412 is provided on the helmet for the purpose of indicating changes required for proper calibration of the simulation to the playing field. By turning the knobs 412, the user may instruct the simulation computer to adjust the scale and the angular orientation of the simulation, thus allowing the simulation to be quickly and easily matched to the size of the field and the location and orientation of the user.

In a preferred embodiment, an omni-directional LASER detector 414 is attached to the helmet, and is used in the manner described below to determine real-time changes in the position and/or orientation of the user. This information is transmitted to the simulation computer via the antenna 400 and transceiver 402, which uses the information to continuously recalibrate the simulation, allowing the user to move about freely during the simulation, either to view the simulation from different perspectives or to actively participate in it.

Figure 5A:
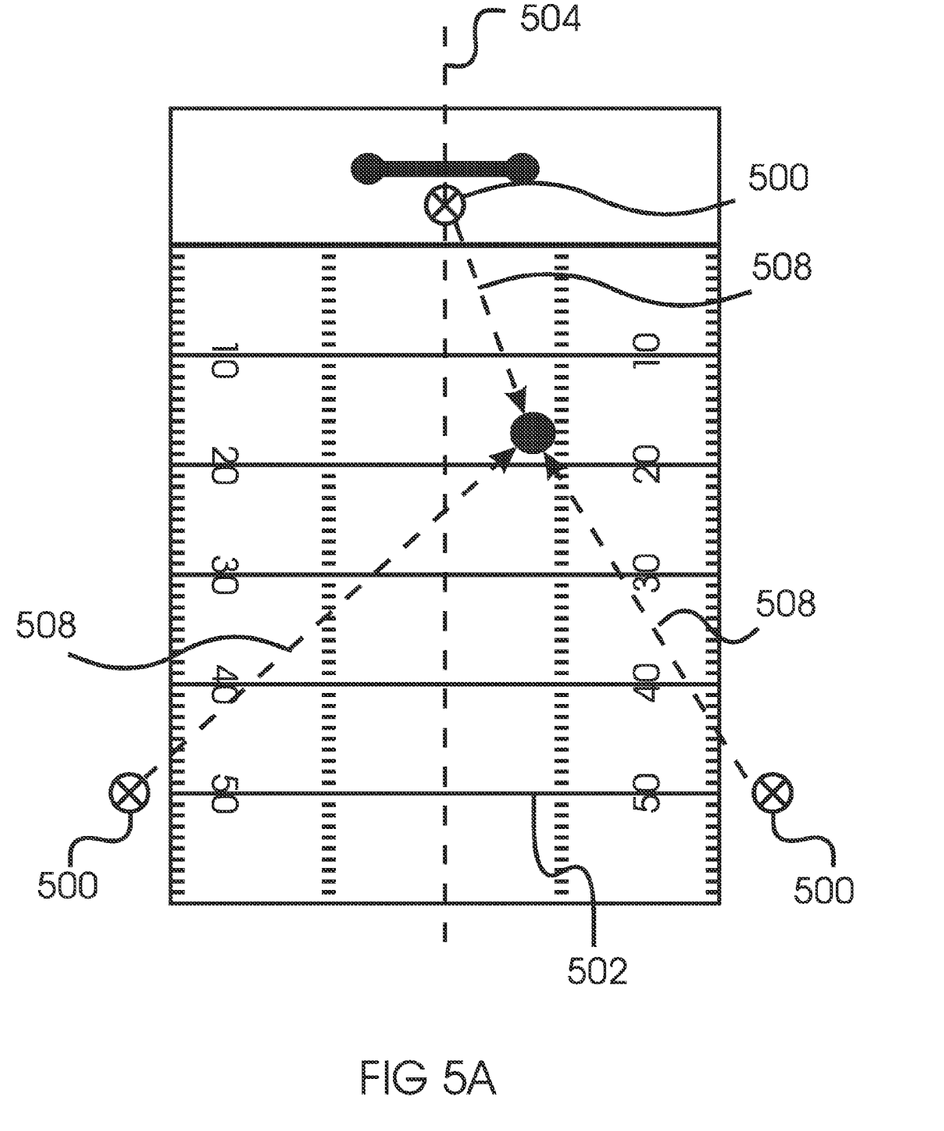
FIGS. 5A and 5B are diagrams of the LASER triangulation means of a preferred embodiment for continuously monitoring the position and orientation of the user.
Figure 5B:
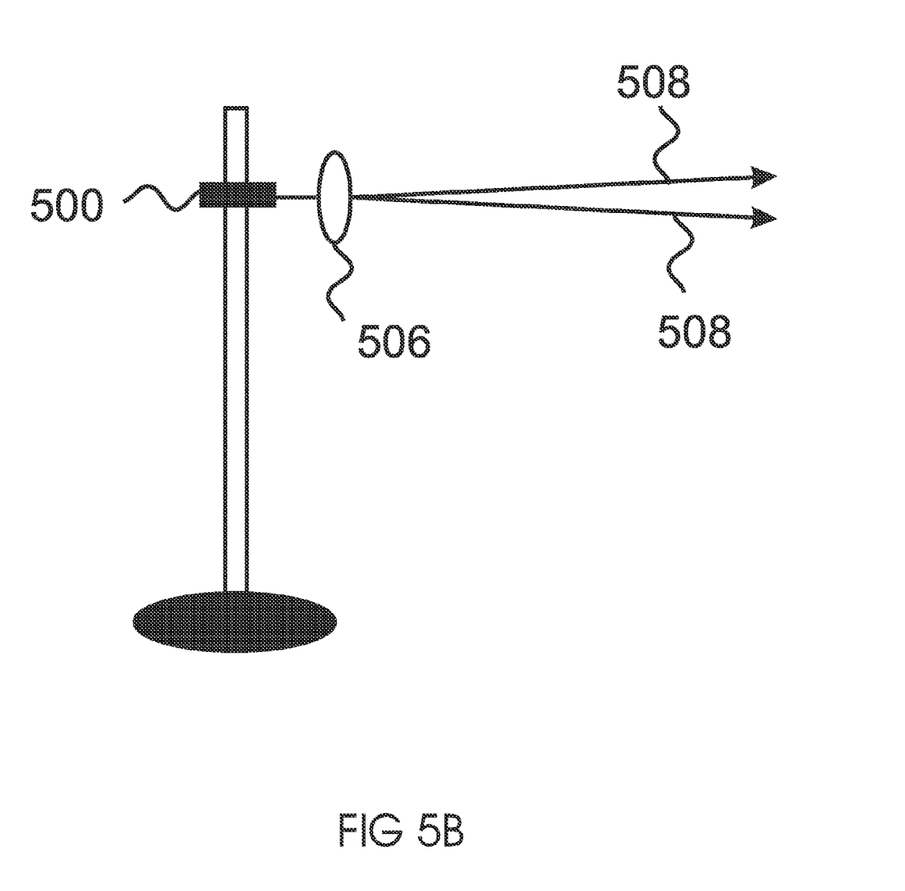

FIGS. 5A and 5B illustrate a preferred method for determining the location and orientation of the user in real time. Three LASER sources 500 are located at separated locations along the boundaries of the playing field. In a preferred embodiment with application to US football, two LASER sources are placed along the two sides of the playing field at points coincident with the mid-line or "50-yard" line 502. The third LASER source is placed in or just beyond the end zone along a line that bisects the field 504. Each of the LASER sources is set to rotate in a plane, and lenses 506 are used to add sufficient vertical dispersion to the beams 508, such that light from all three LASER sources will strike the helmet worn by the user 510 no matter where the user is located on the field and no matter what the elevation of the helmet is above the ground. An omni-directional LASER detector 414 mounted on the helmet detects the directions from which light from the three LASER sources strikes the helmet, and this information is transmitted continuously to the simulation computer, which uses the information to triangulate the position of the user and to determine the user's orientation.

Figure 6:
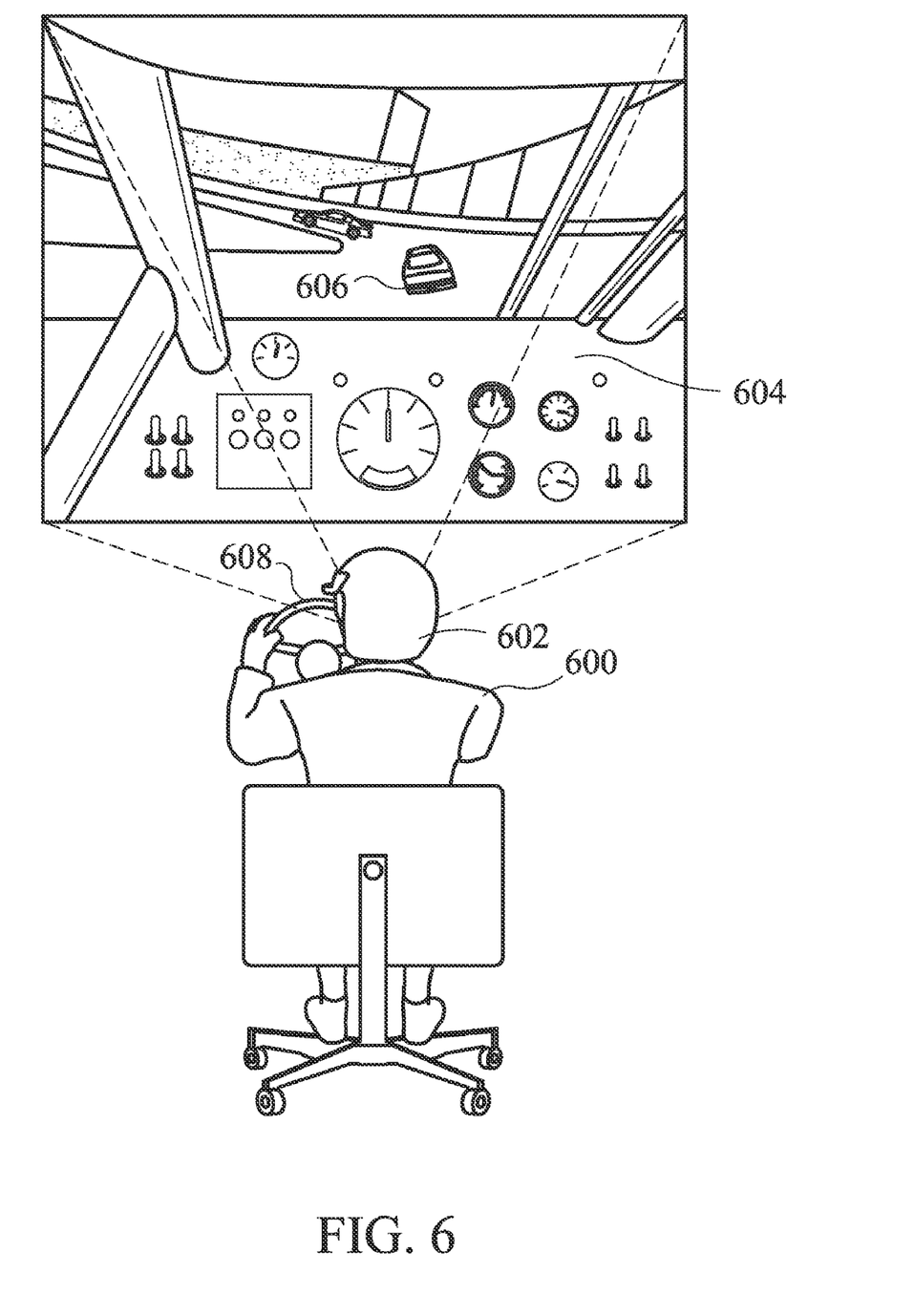
FIG. 6 is a sketch of a user of the invention viewing and controlling the simulation of an automobile race.

Referring to FIG. 6, the invention is used to simulate driving a car in a NASCAR race or similar event. The user 600 sits in a suitable environment, such as a passenger vehicle, or simply a chair in a darkened room, wearing a helmet 602 or other headgear that superimposes simulated images of the cab of the racecar 604 and of the other cars in the race 606 onto the user's field of vision. In a preferred embodiment, artificial intelligence software 206 is used to determine the actions of cars that were not specifically defined in the input. The user grasps a device similar to a steering wheel 608, which he uses to control the simulated racecar. Regardless of the actual environment, the user experiences the sensation of being in a car driving in a NASCAR race.

Other modifications and implementations will occur to those skilled in the art without departing from the spirit and the scope of the invention as claimed. Accordingly, the above description is not intended to limit the invention except as indicated in the following claims.

What is claimed is:

1. An apparatus for generating a virtual reality simulation of at least a portion of a sporting event, the simulation including visual images depicting actions of one or more simulated players, the actions of the simulated players appearing from the perspective of a user to be taking place within the three dimensions of an open location physically occupied by the user, the apparatus comprising:
 a user interface that enables specification of simulation input parameters that at least partly determine the action depicted by the visual images of the simulation, the simulation parameters including at least one of: the starting position of at least one simulated player and the intended actions of at least one simulated player;
 locating means that can determine user position information regarding location and orientation of the user within the open location, including the orientation of the user's head;
 a simulation generator, coupled to the user interface, that can generate the visual images of the simulation, the actions of the simulated players depicted by the visual images based at least partly on the simulation parameters and on the user position information, the scale and perspective of the visual images being continuously updated in real-time based on the user position information including the orientation of the user's head;
 first wireless transceiver means coupled to the simulation generator that can wirelessly receive the user position information transmitted from, and that can further wirelessly transmit the visual images to, a second wireless transceiver means coupled to headgear worn by the user; and
 a visual superimposing apparatus attached to the headgear that superimposes the visual images of the generated simulation onto the user's real-world field of vision of the open space so that it appears from the user's perspective that the one or more simulated players are carrying out their actions within in the three dimensions of the open space physically occupied and viewed by the user and that the user is in the midst of the simulation.

2. The apparatus of claim 1, wherein the user interface can receive at least a portion of its input in the form of a diagrammatic chart of the starting position and intended actions of the one or more simulated players that can be manipulated on a computer screen using at least one of a mouse, a lightpen, and other manipulating means.

3. The apparatus of claim 1, wherein the generated simulation includes audio content, wherein the first wireless transceiver means can transmit the audio content to the second wireless transceiver means of the user's headgear, and wherein the headgear further comprises at least one of: a speaker and other acoustic devices, that are able to transmit the audio content to the user.

4. The apparatus of claim 1, wherein the visual superimposing apparatus comprises at least one partially transmitting mirror that is positioned at an angle in front of at least one of the eyes of the user and wherein at least one image transmitting device is attached to the headgear in such a manner that it can project the visual images onto the at least one partially transmitting mirror, thereby superimposing the visual images onto the user's three dimensional real-world field of vision.

5. The apparatus of claim 1, wherein the visual superimposing apparatus comprises at least one partially transparent liquid crystal image display that is positioned in front of at least one of the eyes of the user so that it can display the visual images and thereby superimpose them onto the user's three dimensional real-world field of vision.

6. The apparatus of claim 1, wherein the simulation generator uses artificial intelligence to predict and simulate at least some of the actions of at least one of the simulated players in accordance with pre-specified general rules of behavior.

7. The apparatus of claim 1, wherein the locating means includes a LASER triangulation system, comprising:
 a plurality of LASER sources placed at a plurality of sites surrounding the open location in which the user is located, the LASER sources being able to project LASER light over the open location in which the user is located;
 at least one LASER light detector, attached to the headgear worn by the user, that is able to detect the LASER light from the plurality of LASER sources and is able to determine the direction from which the light from each of the LASER light sources is detected; and
 means for determining the position and orientation of the user according to the directions from which the LASER light is detected.

8. The apparatus of claim 7, wherein the number of LASER sources is three.

9. The apparatus of claim 8, wherein the open location in which the user is located at least approximates a sports playing field, and wherein two of the LASER sources are placed on either side of the field along a line that equally divides the length of the field, and the third LASER source is placed at one end of the field, along a line that equally divides the width of the field.

10. The apparatus of claim 1, wherein the simulation generator includes artificial intelligence that enables one or more of the simulated players in accordance with pre-specified rules of behavior, to react substantially in real time to movements and actions of the user that cause changes in the position information.

11. The apparatus of claim 1, wherein the user's headgear further comprises means for calibrating and adjusting at least one of: the positioning, angles, and scaling of the visual images of the simulation, relative to the actual position and perspective of the user as defined by the position information.

12. A method for generating a virtual reality simulation of at least a portion of a sporting event, that involves a plurality of the simulation including visual images depicting actions performed by one or more simulated players, the actions of the simulated players appearing from a user's perspective to be taking place within the three dimensions of an open location where the user is physically located and that the user is in the midst of the simulation, the method comprising:

specifying initial positions of all of the simulated players;

specifying intended actions of at least one of the players;

placing a user at an appropriate location in an open area that at least approximates a playing field appropriate to the sporting event being simulated;

determining position information including location and orientation of the user in the open area including the orientation of the user's head;

generating the visual images of the simulation, the actions of the simulated players depicted by the visual images based at least partly on the simulation parameters and on the user position information, said generating further comprising continuously updating in real-time the scale and perspective of the visual images based on the user position information, including the orientation of the user's head;

transmitting wirelessly the visual images to receiving means attached to headgear worn by the user, the headgear being equipped with visual image presentation means that is able to superimpose the visual images onto the real-world field of view of the user;

superimposing the visual images onto the user's real-world field of view of the open area, such that the simulation appears to take place within the three dimensions of the open space to give the user the illusion of being in the midst of the simulation; and calibrating the position, orientation, and scaling of the visual images within the field of view of the user so that the visual images are properly scaled based on the position, orientation, and location of the user within the open area.

13. The method of claim 12 wherein:

said specifying the actions of at least one of the players further comprises establishing general rules of behavior for the at last one player; and said generating further comprises predicting actions of the at least one player in the context of the simulation parameters and according to the general rules of behavior using principals of artificial intelligence.

14. The method of claim 13 wherein said generating further comprises predicting actions of the at least one simulated player in response to actions of the user in the context of the simulation parameters, the determined position information and in accordance with the general rules of behavior using principals of artificial intelligence.

15. An apparatus for creating virtual reality simulations, including visual images associated with the operation of user controlled simulated vehicles, including race cars, trucks, tanks, flying aircraft, and spacecraft, the images creating a specified environment that can include one or more other simulated vehicles or moving components that perform intended actions, and for superimposing the visual images onto the field of view of the user, the apparatus comprising:

a user interface that;

enables specification of simulation input parameters that at least partly determine the specified environment and the intended actions of at least one simulated vehicle or component that is part of the specified environment; and enables specifying general rules of behavior for the at least one vehicle or component;

locating means that can determine the orientation of the user's head;

a simulation generator that can generate a simulation of the specified environment and the intended actions of the at least one simulated vehicle or component of the specified environment, the simulation generated based on the simulation input parameters and the orientation of the user's head, wherein:

the simulation includes visual images of the specified environment including the at least one simulated vehicle or component performing its intended actions, the specified environment including views through windows and windscreens and images of an enclosing environment that would surround a vehicle operator in a real-life situation; and the simulation generator includes artificial intelligence that uses the specified general rules of behavior to predict how the at least one simulated vehicle or component will react, substantially in real time, to the movements and actions of a simulated vehicle controlled directly by the user while otherwise performing its intended actions;

wireless transmission means that can transmit the visual images by wireless means to headgear worn by the user of the simulation;

a visual superimposing apparatus attached to the headgear that is able to superimpose the visual images onto the user's field of vision; and control apparatus of a shape and style appropriate to the activity being simulated for transmitting to the simulation generator, signals representing desired movements and actions of the user's simulated vehicle, the signals generated in response to control actions performed by the user on the control apparatus.

16. The apparatus of claim 15 wherein the control apparatus includes a steering wheel.

17. The apparatus of claim 15 wherein the control apparatus includes a flight control stick.

* * * * *